US009944526B2

(12) United States Patent
Troester et al.

(10) Patent No.: US 9,944,526 B2
(45) Date of Patent: Apr. 17, 2018

(54) CARBON FIBER PREFORMS

(71) Applicant: Honeywell International Inc., Morristown, NJ (US)

(72) Inventors: Jeffrey Troester, Granger, IN (US); Slawomir T. Fryska, Granger, IN (US)

(73) Assignee: Honeywell International Inc., Morris Plains, NJ (US)

( * ) Notice: Subject to any disclaimer, the term of this patent is extended or adjusted under 35 U.S.C. 154(b) by 28 days.

(21) Appl. No.: 14/711,426

(22) Filed: May 13, 2015

(65) Prior Publication Data

US 2016/0332881 A1 Nov. 17, 2016

(51) Int. Cl.
| C01B 31/00 | (2006.01) |
| B29B 11/16 | (2006.01) |
| B29C 70/24 | (2006.01) |
| C04B 35/83 | (2006.01) |
| B32B 18/00 | (2006.01) |
| F16D 69/02 | (2006.01) |
| C01B 32/00 | (2017.01) |
| B29C 64/106 | (2017.01) |

(Continued)

(52) U.S. Cl.
CPC ............... *C01B 31/00* (2013.01); *B29B 11/16* (2013.01); *B29C 64/106* (2017.08); *B29C 70/24* (2013.01); *B32B 18/00* (2013.01); *C01B 32/00* (2017.08); *C04B 35/83* (2013.01); *F16D 69/023* (2013.01); *B33Y 10/00* (2014.12); *B33Y 70/00* (2014.12); *C04B 2235/5268* (2013.01); *C04B 2235/6026* (2013.01); *C04B 2235/614* (2013.01); *C04B 2235/77* (2013.01); *C04B 2237/385* (2013.01)

(58) Field of Classification Search
CPC ..... C01B 31/00; C01B 32/00; B29C 67/0055; B29C 70/24; B29C 64/106; B29B 11/16; C04B 35/83; C04B 2235/6026; C04B 2237/385; C04B 2235/77; C04B 2235/614; C04B 2235/5268; B33Y 10/00; B33Y 70/00; F16D 69/023; B32B 18/00
See application file for complete search history.

(56) References Cited

U.S. PATENT DOCUMENTS

| 3,028,284 A | 4/1962 | Reeves |
| 3,596,314 A | 8/1971 | Krugler |

(Continued)

FOREIGN PATENT DOCUMENTS

| CN | 101511569 A | 8/2009 |
| CN | 103939509 A | 7/2014 |

(Continued)

OTHER PUBLICATIONS

Extended Search Report from counterpart European Application No. 16167167.2-1703, dated Sep. 28, 2016, 5 pp.

(Continued)

*Primary Examiner* — Brian Handville
(74) *Attorney, Agent, or Firm* — Shumaker & Sieffert, P.A.

(57) ABSTRACT

In some examples, a method for forming a carbon fiber preform includes depositing, via a print head of a three-dimensional printing system, a first plurality of carbon fibers to form a first layer of carbon fibers in approximately an x-y plane, wherein the first plurality of carbon fibers are deposited around an array of carbon fiber filaments extending in approximately a z-axis direction relative to the x-y plane.

18 Claims, 5 Drawing Sheets

(51) Int. Cl.
 *B33Y 10/00* (2015.01)
 *B33Y 70/00* (2015.01)

(56) References Cited

U.S. PATENT DOCUMENTS

| | | | |
|---|---|---|---|
| 3,703,255 A | 11/1972 | Wade |
| 3,975,128 A | 8/1976 | Schluter |
| 3,982,877 A | 9/1976 | Wyeth et al. |
| 4,264,556 A | 4/1981 | Kumar et al. |
| 4,428,906 A | 1/1984 | Rozmus |
| 4,756,680 A | 7/1988 | Ishii |
| 4,837,073 A | 6/1989 | McAllister et al. |
| 4,957,585 A | 9/1990 | Semff |
| 5,009,823 A | 4/1991 | Kromrey |
| 5,137,663 A | 8/1992 | Conaway |
| 5,137,755 A | 8/1992 | Fujikawa et al. |
| 5,147,588 A | 9/1992 | Okura et al. |
| 5,178,705 A | 1/1993 | Kimbara et al. |
| 5,187,001 A | 2/1993 | Brew |
| 5,242,746 A | 9/1993 | Bommier et al. |
| 5,283,109 A | 2/1994 | Kaplan et al. |
| 5,306,448 A | 4/1994 | Kromrey |
| 5,382,392 A | 1/1995 | Prevorsek et al. |
| 5,516,271 A | 5/1996 | Swenor et al. |
| 5,518,385 A | 5/1996 | Graff |
| 5,576,358 A | 11/1996 | Lem et al. |
| 5,686,144 A | 11/1997 | Thebault et al. |
| 5,759,622 A | 6/1998 | Stover |
| 5,962,135 A | 10/1999 | Walker et al. |
| 6,054,082 A | 4/2000 | Heide et al. |
| 6,093,482 A | 7/2000 | Park et al. |
| 6,110,268 A | 8/2000 | Gross et al. |
| 6,214,279 B1 | 4/2001 | Yang et al. |
| 6,221,475 B1 | 4/2001 | Domergue et al. |
| 6,245,424 B1 | 6/2001 | Lau et al. |
| 6,261,486 B1 | 7/2001 | Sulzbach et al. |
| 6,267,920 B1 | 7/2001 | Arakawa et al. |
| 6,305,925 B1 | 10/2001 | Cassani |
| 6,325,608 B1 | 12/2001 | Shivakumar et al. |
| 6,358,565 B1 | 3/2002 | Krenkel et al. |
| 6,372,166 B1 | 4/2002 | Cassani |
| 6,455,159 B1 | 9/2002 | Walker et al. |
| 6,508,970 B2 | 1/2003 | Chandra |
| 6,521,152 B1 | 2/2003 | Wood et al. |
| 6,537,470 B1 | 3/2003 | Wood et al. |
| 6,555,173 B2 | 4/2003 | Forsythe et al. |
| 6,578,474 B1 | 6/2003 | Sasaki |
| 6,726,753 B2 | 4/2004 | Kouchouthakis et al. |
| 6,749,937 B2 | 6/2004 | Gray |
| 6,756,121 B2 | 6/2004 | Forsythe et al. |
| 6,884,467 B2 | 4/2005 | Walker et al. |
| 6,886,668 B2 | 5/2005 | Kouchouthakis et al. |
| 6,896,968 B2 | 5/2005 | Golecki |
| 6,939,490 B2 | 9/2005 | La Forest et al. |
| 7,025,913 B2 | 4/2006 | La Forest et al. |
| 7,063,870 B2 | 6/2006 | La Forest et al. |
| 7,118,805 B2 | 10/2006 | Walker et al. |
| 7,141,207 B2 | 11/2006 | Jandeska, Jr. et al. |
| 7,172,408 B2 | 2/2007 | Wood et al. |
| 7,198,739 B2 | 4/2007 | La Forest et al. |
| 7,252,499 B2 | 8/2007 | La Forest et al. |
| 7,318,717 B2 | 1/2008 | Wood et al. |
| 7,332,112 B1 | 2/2008 | Shivakumar et al. |
| 7,332,195 B2 | 2/2008 | Arico et al. |
| 7,370,738 B2 | 5/2008 | Vollweiter |
| 7,393,370 B2 | 7/2008 | Peterman, Jr. et al. |
| 7,423,072 B2 | 9/2008 | Lee et al. |
| 7,442,024 B2 | 10/2008 | La Forest et al. |
| 7,556,490 B2 | 7/2009 | Wicker et al. |
| 7,589,868 B2 | 9/2009 | Velde et al. |
| 7,632,435 B2 | 12/2009 | Simpson et al. |
| 7,681,627 B2 | 3/2010 | Schmitz et al. |
| 7,698,817 B2 | 4/2010 | Khambete et al. |
| 7,700,014 B2 | 4/2010 | Simpson et al. |
| 7,727,448 B2 | 6/2010 | Boutefeu et al. |
| 7,867,566 B2 | 1/2011 | Blanton et al. |
| 7,972,129 B2 | 7/2011 | O'Donoghue |
| 8,002,919 B2 * | 8/2011 | Johnson ............... B29C 70/086 156/148 |
| 8,492,466 B2 | 7/2013 | Abe et al. |
| 8,501,033 B2 | 8/2013 | Southwell et al. |
| 8,592,519 B2 | 11/2013 | Martinoni |
| 8,742,014 B2 | 6/2014 | Hongo |
| 2001/0030094 A1 | 10/2001 | Pareti |
| 2003/0021901 A1 | 1/2003 | Gasse |
| 2003/0030188 A1 | 2/2003 | Spengler |
| 2003/0111752 A1 | 6/2003 | Wood et al. |
| 2003/0143436 A1 | 7/2003 | Forsythe et al. |
| 2003/0214064 A1 | 11/2003 | Shin et al. |
| 2004/0020728 A1 | 2/2004 | Koucouthakis et al. |
| 2004/0113302 A1 | 6/2004 | La Forest et al. |
| 2004/0168612 A1 | 9/2004 | Saver |
| 2004/0202896 A1 | 10/2004 | Gray |
| 2004/0219510 A1 | 11/2004 | Lowery et al. |
| 2006/0046059 A1 | 3/2006 | Arico et al. |
| 2006/0069176 A1 | 3/2006 | Bowman et al. |
| 2006/0197244 A1 | 9/2006 | Simpson et al. |
| 2006/0232392 A1 | 10/2006 | Emmett et al. |
| 2006/0267252 A1 | 11/2006 | Steinmann et al. |
| 2006/0279012 A1 | 12/2006 | Simpson et al. |
| 2007/0063378 A1 | 3/2007 | O'Donoghue |
| 2007/0154712 A1 | 7/2007 | Mazany et al. |
| 2007/0218208 A1 | 9/2007 | Walker et al. |
| 2008/0318010 A1 | 12/2008 | Wozniak et al. |
| 2009/0145314 A1 | 6/2009 | Botrie |
| 2009/0169825 A1 | 7/2009 | Farmer et al. |
| 2009/0176034 A1 | 7/2009 | Ruuttu et al. |
| 2009/0229926 A1 | 9/2009 | Schaefer |
| 2009/0298962 A1 | 12/2009 | Studer et al. |
| 2010/0000070 A1 | 1/2010 | La Forest et al. |
| 2011/0030940 A1 | 2/2011 | Takeda |
| 2012/0104659 A1 | 5/2012 | La Forest et al. |
| 2012/0251829 A1 | 10/2012 | Xu et al. |
| 2012/0304449 A1 | 12/2012 | Jackson et al. |
| 2013/0157826 A1 | 6/2013 | Preckel et al. |
| 2013/0174969 A1 | 7/2013 | Karb et al. |
| 2013/0237636 A1 * | 9/2013 | Strauss ............... C08L 61/28 523/219 |
| 2013/0244039 A1 | 9/2013 | Peters et al. |
| 2013/0248304 A1 | 9/2013 | Lee et al. |
| 2013/0284548 A1 | 10/2013 | Guether et al. |
| 2014/0134335 A1 | 5/2014 | Pridoehl et al. |
| 2014/0194328 A1 | 7/2014 | Alessi |
| 2014/0298728 A1 | 10/2014 | Keshavan |
| 2014/0356612 A1 | 12/2014 | Sano et al. |
| 2014/0361460 A1 | 12/2014 | Mark |
| 2015/0018136 A1 | 1/2015 | Goldstein et al. |
| 2015/0093506 A1 | 4/2015 | Bucci et al. |
| 2015/0321187 A1 | 11/2015 | Dias et al. |
| 2016/0046803 A1 | 2/2016 | Boday et al. |
| 2016/0151982 A1 | 6/2016 | Sand |
| 2016/0346997 A1 | 12/2016 | Lewis et al. |

FOREIGN PATENT DOCUMENTS

| | | |
|---|---|---|
| CN | 104451606 A | 3/2015 |
| CN | 104496508 A | 4/2015 |
| DE | 102007057450 A1 | 6/2009 |
| DE | 102014006432 A1 | 11/2015 |
| EP | 1165191 A1 | 1/2002 |
| EP | 1724245 A1 | 11/2006 |
| EP | 1731292 A2 | 12/2006 |
| EP | 2295227 A2 | 3/2011 |
| EP | 2450170 A2 | 9/2012 |
| EP | 24050170 A1 | 9/2012 |
| EP | 3095593 A1 | 11/2016 |
| GB | 2386951 | 1/2003 |
| GB | 2470098 | 11/2010 |
| JP | 2013088196 | 5/2013 |
| JP | 5352893 B2 | 11/2013 |
| WO | 9908980 A1 | 2/1999 |
| WO | 0054852 A1 | 9/2000 |
| WO | 2004050319 A1 | 6/2004 |
| WO | 2004052629 A1 | 6/2004 |

(56) References Cited

FOREIGN PATENT DOCUMENTS

| WO | 2004106766 | | 12/2004 |
|---|---|---|---|
| WO | 2006033373 | A1 | 3/2006 |
| WO | 2006086167 | A1 | 8/2006 |
| WO | 2013126981 | A1 | 9/2013 |
| WO | 2014035382 | A1 | 3/2014 |
| WO | 2014060430 | A1 | 4/2014 |
| WO | 2014134224 | A2 | 9/2014 |
| WO | 2014153535 | A1 | 9/2014 |
| WO | 2014174540 | A1 | 10/2014 |
| WO | 2014175625 | A1 | 10/2014 |
| WO | 2015006697 | A1 | 1/2015 |
| WO | 2015038260 | A2 | 3/2015 |
| WO | 2015053658 | A1 | 4/2015 |

OTHER PUBLICATIONS

Senese, "MarkForged Lets you 3D Print with Carbon Fiber and Kevlar on a Budget," Makezine, retrieved from URL: http: //makezine.com/ 2015/01/ 15/3d-printed-carbon-fiber-markforged and accessed Nov. 11, 2016, Jan. 15, 2015, 6 pp.
Crandall, "Where Will Additive Manufacturing Take Us?," APICS Magazine, Jan./Feb. 2013, 3 pp.
U.S. Appl. No. 14/711,508, by Honeywell International Inc. (Inventors: Slawonnir T. Fryska et al.), filed May 13, 2015.
U.S. Appl. No. 14/711,550, by Honeywell International Inc. (Inventors: Slawomir T. Fryska et al.), filed May 13, 2015.
U.S. Appl. No. 14/711,590, by Honeywell International Inc. (Inventors: Jeffrey Troester et al.), filed May 13, 2015.
U.S. Appl. No. 14/788,217, by Honeywell International Inc. (Inventors: Mark L. La Forest et al.), filed Jun. 30, 2015.
U.S. Appl. No. 62/161,109, by Honeywell International Inc. (Inventors: Jeffrey Rowe et al.), filed May 13, 2015.
Vie et al., "Inkjet printing of 200 nm monodisperse carbon nanoparaticles: from nanoparticles synthesis to smart ink formulation," NSTI-Nanotech, vol. 2, May 2013, pp. 243-246.
Black, "3D Printing continuous carbon fiber composites?," Composites World, Gardner Business Media, Inc., May 1, 2014, 8 pp.
Divyashree et al., "Design, Implement and Develop CNT-Metal Composite PCB Wiring Using a Metal 3D Printer," International Journal of Scientific & Engineering Research, vol. 5, No. 5, May 2014, 5 pp.
Krassenstein, "3DXTech's Carbon Nanotube 3D Printer Filament is Here: Exclusive images and details," 3DXTECH, May 13, 2014, 2 pp.
Thryft, "3D Printing High-Strength Carbon Composites Using PEEK, PAEK," Design News, Engineering Materials, Apr. 14, 2014, 5 pp.
"Application of nanoparticles could improve ALM components," technical trends ALM, MPR, Elsevier Ltd., Nov.-Dec. 2012, 3 pp.
"Carbon-fiber filled Nylon—A Material Alternative," Northwest Rapid Manufacturing, Jun. 25, 2012, 3 pp.
"Mark One, the world's first carbon fiber 3D printer now available for pre-order," 3D printer and 3D printing news, www.3ders.org, Feb. 18, 2014, 11 pp.
"Arevo Labs introduces carbon fiber reinforced polymers to 3D print ultra-strong parts," 3D printer and 3D printing news, www. 3ders.org, Mar. 24, 2014, 9 pp.
U.S. Appl. No. 15/048,840, by Honeywell International Inc. (Inventors: Jeffrey Rowe et al.), filed Feb. 19, 2016.
U.S. Appl. No. 14/854,993, by Honeywell International Inc. (Inventors: Mark L. La Forest et al.), filed Sep. 15, 2015.
U.S. Appl. No. 14/954,783, by Honeywell International Inc. (Inventors: Mark L. La Forest et al.), filed Nov. 30, 2015.
A. Fatz, et al., "Manufacture of Functionally Gradient Carbon-Carbon Composites," Proceedings of the 17 th Technical Conference of the American Society of Composites, Oct. 21-23, 2002, Purdue University, West Lafayette, Ind., 9 pp.
Tekinalp et al., "Highly oriented carbon fiber-polymer composites via additive manufacturing," Composites Science and Technology, ElSevier, Oct. 9, 2014, 7 pp.
Text Intended to Grant from counterpart European Application No. 16167167.2-1703, dated Jul. 10, 2017, 34 pp.
Notice of Intent to Grant and Text Intended to Grant from counterpart European Application No. 16167167.2, dated Dec. 11, 2017, 60 pp.

\* cited by examiner

CARBON FIBER PREFORMS

TECHNICAL FIELD

The disclosure relates to carbon fiber preforms, e.g., as used to form carbon-carbon composite materials.

BACKGROUND

Carbon fiber-reinforced carbon materials, also referred to as carbon-carbon (C—C) composite materials, are composite materials that include carbon fibers reinforced in a matrix of carbon material. The C—C composite materials can be used in many high temperature applications. For example, the aerospace industry employs C—C composite materials as friction materials for commercial and military aircraft, such as brake friction materials.

SUMMARY

Devices, systems, and techniques for forming a carbon fiber preform are described. Example a carbon fiber preforms and carbon-carbon composite components resulting from the techniques are also described. In some examples, carbon fiber preforms may include a plurality of individual layers of carbon fibers. The individual layers may be formed on a layer by layer basis by depositing the carbon fibers using a three-dimensional printing system. Together, the individual layers may form a carbon fiber preform having a desired geometry.

In one aspect, the disclosure is directed to a method for forming a carbon fiber preform, the method comprising depositing, via a print head of a three-dimensional printing system, a first plurality of carbon fibers to form a first layer of carbon fibers in approximately an x-y plane, wherein the first plurality of carbon fibers are deposited around and between respective carbon fiber filaments of an array of carbon fiber filaments extending in approximately a z-axis direction relative to the x-y plane.

In some examples, the method further includes at least one of translating the array of carbon fiber relative the x-y plane or rotating the array of carbon fiber filaments about an axis substantially parallel to the z-axis direction following the formation of the first layer of carbon fibers; and depositing, via the print head of the three-dimensional printing system, a second plurality of carbon fibers on the first layer of carbon fibers to form a second layer of carbon fibers in approximately the x-y plane, wherein the second plurality of carbon fibers are deposited around and between respective carbon fiber filaments of the array of carbon fiber filaments extending in approximately a z-axis direction relative the x-y plane following the at least one of translation or rotation of the array of carbon fiber filaments, and wherein the carbon fiber preform includes the first layer of carbon fibers, second layer of carbon fibers and the array of carbon fiber filaments.

In another aspect, the disclosure is directed to a carbon fiber preform comprising a first layer of carbon fibers formed by depositing, via a print head of a three-dimensional printing system, a first plurality of carbon fibers in approximately an x-y plane; and an array of carbon fiber filaments extending in approximately a z-axis direction relative to the x-y plane, wherein the first plurality of carbon fibers are deposited around and between respective carbon fiber filaments of the array of carbon fiber filaments.

The details of one or more examples are set forth in the accompanying drawings and the description below. Other features, objects, and advantages of the disclosure will be apparent from the description and drawings, and from the claims.

DETAILED DESCRIPTION

Figure 1:
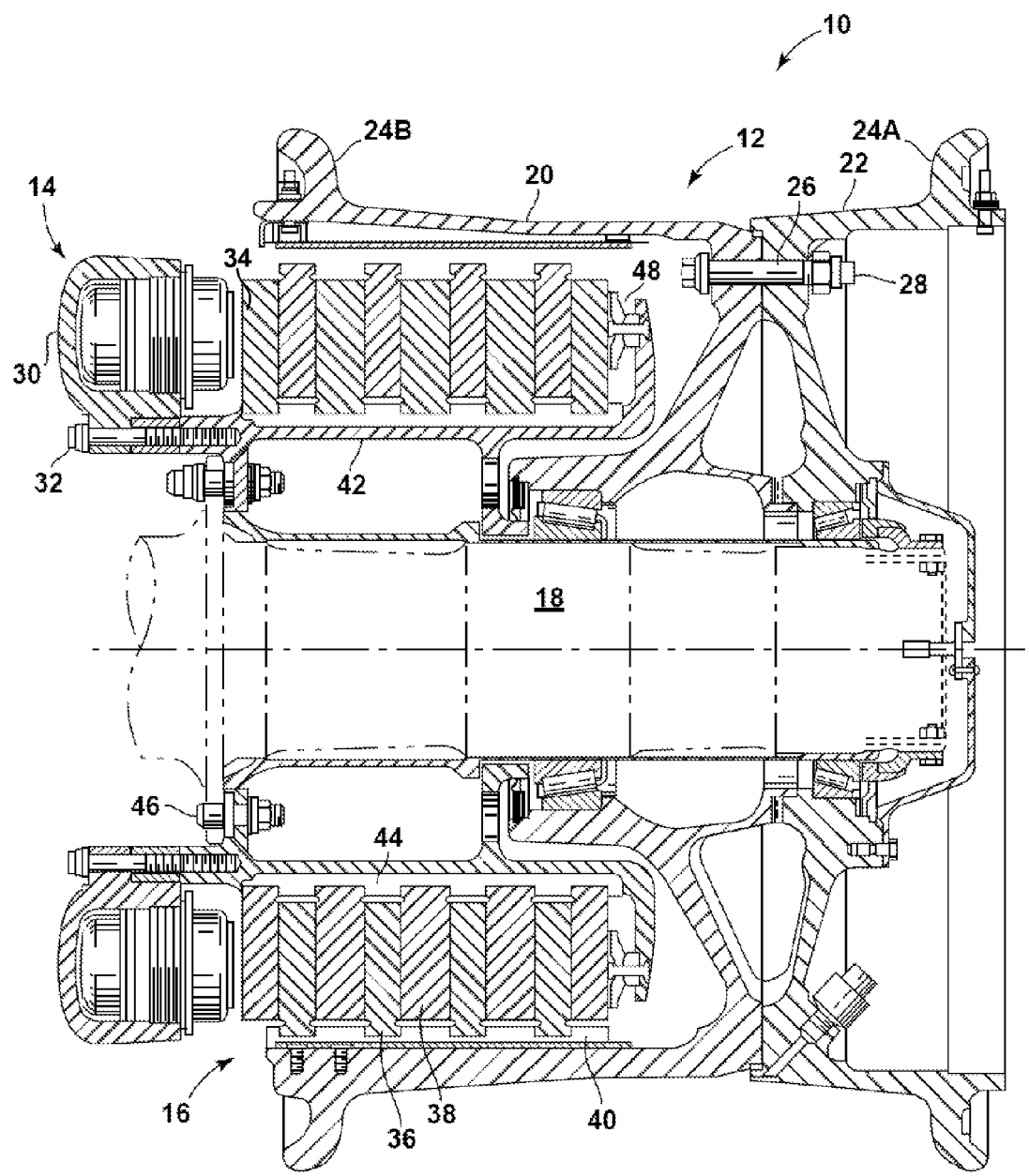
FIG. 1 is a schematic block diagram illustrating an example aircraft brake assembly.

Example techniques for forming a carbon fiber preform are described herein, along with carbon-carbon composite materials and structures formed from the carbon fiber preform. Densified C—C composite materials used, for example, in aerospace applications such as brake discs, may be formed from carbon fiber preforms that have been densified using one or more densification techniques. For example, a carbon fiber preform may be formed by stacking fabric sheets made of woven or nonwoven carbon fiber. The stack of fabric sheets may then be needled together to entangle the sheets in the axial (z-axis direction). The stacked carbon fiber preform or other preform may then be densified, e.g., by infiltrating the preform with liquid pitch using vacuum pressure infiltration (VPI) and/or resin transfer molding (RTM) followed by carbonization of the pitch to achieve a C—C composite material exhibiting a desired final density. Additionally or alternatively, chemical vapor infiltration (CVI) or chemical vapor deposition (CVD) may be used to densify the carbon fiber preform or other preform. In the case of an aircraft brake disc, in some examples, the carbonized preform may take the form of an annular ring, although other shapes may also be used.

In accordance with one or more examples of the disclosure, a carbon fiber preform may be formed by a plurality of layers of carbon fibers stacked on each other. The individual layers of carbon fibers may be formed by depositing, via a print head of a three-dimensional printing system, carbon fibers to form a layer in approximately an x-y plane (e.g., in the x-y plane, or nearly in the x-y plane, but for minor variances in the surface defined by the layer). The x-y plane may defined along an x-axis and a y-axis, which may be orthogonal to each other. The carbon fibers for each layer may be deposited around and between individual carbon fiber filaments of an array of carbon fiber filaments extending in approximately the z-axis direction (e.g., in the z-axis direction or nearly in the z-axis direction but for minor variances in the filaments) relative to the x-y plane. The z-axis may be orthogonal to the x- and y-axes. Following the formation of an individual layer of carbon fibers, the array of carbon fiber filaments may be translated relative to the x-y plane and/or rotated about an axis substantially parallel to the z-axis direction. Following the translation and/or rotation of the array of carbon fiber filaments, another layer of carbon fibers may be formed on the previously formed layer by again depositing carbon fibers via the print head of the three-dimensional printing system around and between the array of carbon filaments as previously translated/rotated.

The process of forming one or more carbon fiber layers around and between the array of carbon filaments, followed by the translation relative to the x-y plane and/or rotation of the carbon fiber filaments about an axis substantially parallel to the z-axis direction may be repeated until the carbon fiber layers stacked along the x-y plane to form a carbon fiber preform with desired properties and geometry. The array of carbon fiber filaments may help fix the layers of carbon fibers relative to each other by providing a connection between the layers in the z-axis direction. In some examples, the carbon fiber preform may be used to form a densified C—C composite material, e.g., by further carbonizing and densifying the resulting carbon fiber preform.

Examples of the disclosure may allow for one or more advantages. For example, by utilizing a three-dimensional printing process to form the individual layers that define the overall carbon fiber preform, a carbon fiber preform may be fabricated with improved control (e.g., uniformity) of properties, such as, e.g., composition, density, fiber pattern and/or woven pattern, across the volume of the preform as well as a carbon fiber preform with a desired geometry. As another example, a carbon fiber preform with multiple individual layers of carbon fibers may be formed without requiring the prior fabrication of carbon fiber fabric segments, followed by the needling of those segments, while still providing attachments of the individual carbon fiber layers in the z-axis direction.

As another example, a carbon fiber preform may be formed without having to carbonize the preform, or minimizing the carbonization of the preform, after all the layers have been formed, e.g., by using previously carbonized fibers to form the individual layers. In comparison, with some other preforms, polyacrylonitrile (PAN) fiber fabrics are layered and needled to form a preform followed by carbonizing of all the fabric layers at once. The PAN fibers may be relatively flexible to allow a textile style manufacturing process to be used in the production of the z-axis fibers (e.g., fibers generally extending longitudinally along the z-axis) via needling without worry of breaking a stiff carbon fiber. Post needling, the fibers then have to be carbonized to change the state of the fibers from PAN to carbon. This process may produce undesirable outgases, such as, e.g., cyanide.

FIG. 1 is a conceptual diagram illustrating an example assembly 10 that may include one or more C—C composite material components formed in accordance with he techniques of this disclosure. For ease of description, examples of the disclosure will be described primarily with regard to aircraft brake discs formed of C—C composite materials. However, the C—C composite materials and preceding carbon fiber preforms of this disclosure may be used to form parts other than aircraft brake discs. For example, the C—C composite material may be used a friction material in other types of braking applications, as well as in other applications such as, e.g., heat exchangers and heat shields.

In the example of FIG. 1, aircraft brake assembly 10 includes wheel 12, actuator assembly 14, brake stack 16, and axle 18. Wheel 12 includes wheel hub 20, wheel outrigger flange 22, bead seats 24A and 24B, lug bolt 26, and lug nut 28. Actuator assembly 14 includes actuator housing 30, actuator housing bolt 32, and ram 34. Brake stack 16 includes alternating rotor discs 36 and stator discs 38; rotor discs 36 are configured to move relative to stator discs 38. Rotor discs 36 are mounted to wheel 12, and in particular wheel hub 20, by beam keys 40. Stator discs 38 are mounted to axle 18, and in particular torque tube 42, by splines 44. Wheel assembly 10 may support any variety of private, commercial, or military aircraft.

Wheel assembly 10 includes wheel 18, which in the example of FIG. 1 is defined by a wheel hub 20 and a wheel outrigger flange 22. Wheel outrigger flange 22 is mechanically affixed to wheel hub 20 by lug bolts 26 and lug nuts 28. Wheel 12 defines bead seals 24A and 24B. During assembly, an inflatable tire (not shown) may be placed over wheel hub 20 and secured on an opposite side by wheel outrigger flange 22. Thereafter, lug nuts 28 can be tightened on lug bolts 26, and the inflatable tire can be inflated with bead seals 24A and 24B providing a hermetic seal for the inflatable tire.

Wheel assembly 10 may be mounted to an aircraft via torque tube 42 and axle 18. In the example of FIG. 1, torque tube 42 is affixed to axle 18 by a plurality of bolts 46. Torque tube 42 supports actuator assembly 14 and stators 38. Axle 18 may be mounted on a strut of a landing gear (not shown) to connect wheel assembly 10 to an aircraft.

During operation of the aircraft, braking may be necessary from time to time, such as during landing and taxiing. Wheel assembly 10 is configured to provide a braking function to an aircraft via actuator assembly 14 and brake stack 16. Actuator assembly 14 includes actuator housing 30 and ram 34. Actuator assembly 14 may include different types of actuators such as one or more of, e.g., an electrical-mechanical actuator, a hydraulic actuator, a pneumatic actuator, or the like. During operation, ram 34 may extend away from actuator housing 30 to axially compress brake stack 16 against compression point 48 for braking.

Brake stack 16 includes alternating rotor discs 36 and stator discs 38. Rotor discs 36 are mounted to wheel hub 20 for common rotation by beam keys 40. Stator discs 38 are mounted to torque tube 42 by splines 44. In the example of FIG. 1, brake stack 16 includes four rotors and five stators. However, a different number of rotors and/or stators may be included in brake stack 16 in other examples. Further, the relative positions of the rotors and stators may be reverse, e.g., such that rotor discs 36 are mounted to torque tube 42 and stator discs 38 are mounted to wheel hub 20.

Rotor discs 36 and stator discs 38 may provide opposing friction surfaces for braking an aircraft. As kinetic energy of a moving aircraft is transferred into thermal energy in brake stack 16, temperatures may rapidly increase in brake stack 16, e.g., beyond 200 degrees Celsius. With some aircraft, emergency braking (e.g., rejected takeoff) may result in temperatures of the components in excess of 500 degrees Celsius, and in some cases, even beyond 800 degrees Celsius. As such, rotor discs 36 and stator discs 38 that form brake stack 16 may include robust, thermally stable materials capable of operating at such temperatures.

Figure 2:
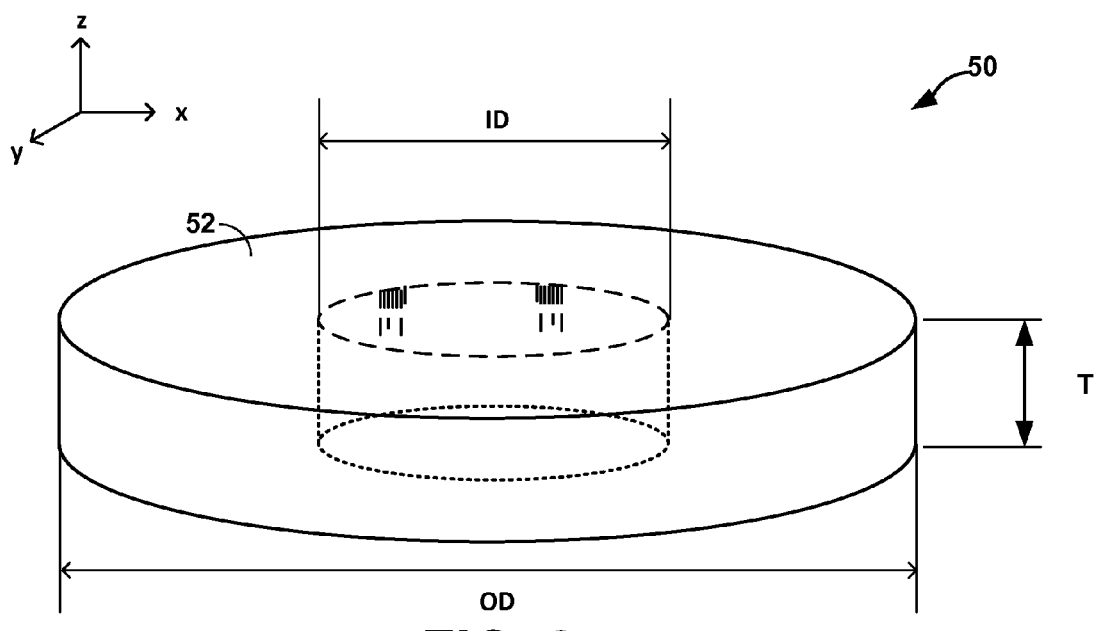
FIG. 2 is a conceptual diagram illustrating an example carbon fiber preform in accordance with aspects of the disclosure.

In one example, rotor discs 36 and/or stator discs 38 are formed of a C—C composite material fabricated according to one or more example techniques of this disclosure (e.g., the technique described with respect to FIG. 2). In particular, at least one of rotor discs 36 and/or at least one of stator discs 38 may be formed from densified C—C material fabricated from a carbon fiber preform generated via one or more of the example techniques of this disclosure. Rotor discs 36 and stator discs 38 may be formed of the same materials or different materials. For example, wheel assembly 10 may include metal rotor discs 36 and C—C composite stator discs 38, or vice versa. Further, each disc of the rotor discs 36 and/or each disc of the stator discs 38 may be formed of the same materials or at least one disc of rotor discs 36 and/or stator discs 38 may be formed of a different material than at least one other disc of the rotor discs 36 and/or stator discs 38.

As briefly noted, in some examples, rotor discs 36 and stator discs 38 may be mounted in wheel assembly 10 by beam keys 40 and splines 44, respectively. In some examples, beam keys 40 may be circumferentially spaced about an inner portion of wheel hub 20. Beam keys 40 may, for example, be shaped with opposing ends (e.g., opposite sides of a rectangular) and may have one end mechanically affixed to an inner portion of wheel hub 20 and an opposite end mechanically affixed to an outer portion of wheel hub 20. Beam keys 40 may be integrally formed with wheel hub 20 or may be separate from and mechanically affixed to wheel hub 20, e.g., to provide a thermal barrier between rotor discs 36 and wheel hub 20. Toward that end, in different examples, wheel assembly 10 may include a heat shield (not shown) that extends out radially and outwardly surrounds brake stack 16, e.g., to limit thermal transfer between brake stack 16 and wheel 12.

In some examples, splines 44 may be circumferentially spaced about an outer portion of torque tube 42. Splines 44 may, for example, be integrally formed with torque tube 42 or may be separate from and mechanically affixed to torque tube 42. In some examples, splines 44 may define lateral grooves in torque tube 42. As such, stator discs 38 may include a plurality of radially inwardly disposed notches configured to be inserted into a spline.

Because beam keys 40 and splines 44 may be in thermal contact with rotor discs 36 and stator discs 38, respectively, beam keys 40 and/or splines 44 may be made of thermally stable materials including, e.g., those materials discussed above with respect to rotor discs 36 and stator discs 38. Accordingly, in some examples, example techniques of the disclosure may be used to form a beam key and/or spline for wheel assembly 10.

The example assembly 10 shown in FIG. 1 is merely one example. In other examples, assembly 10 and the components of assembly 10 (e.g., wheel 10, actuator assembly 14, brake stack 16, and axle 18) may have another suitable configuration. In addition, in other examples, the C—C composite materials described herein resulting from example carbon fiber preforms may be used to form other structures in addition to, or instead of, one or more of discs 36, 38, keys 40, and spline 44.

FIG. 2 is a conceptual diagram illustrating example carbon fiber preform 50 in accordance with aspects of the disclosure. As shown, preform 50 is an annular ring with an inner diameter (ID), outer diameter (OD), and a thickness (T) measured in the z-axis direction. Orthogonal x-y-z axes are shown in FIG. 2 for ease of description of preform 50. In some examples, preform 50 may have an inner diameter (ID) of about 4 inches to about 18 inches (about 10.16 centimeters (cm) to about 45.72 cm), and outer diameter (OD) of about 10 inches to about 30 inches (about 25.4 cm to about 76.2 inches), and a thickness (T) of about 0.5 inches to about 2.5 inches (about 1.27 cm to about 6.35 cm). Other ranges and geometries are contemplated. The thickness of the individual layers that define preform 50 may be dependent on the design intent of preform 50 for a given application. In some examples, the thickness of the individual layers of deposited carbon fibers may range from approximately 25 mils to approximately 125 mils (approximately 0.635 millimeters (mm) to approximately 3.175 mm), although other thicknesses are contemplated.

Carbon fiber preform 50 is formed of composite material substrate 52, which includes a plurality of individual carbon fiber layers (not shown in FIG. 2) formed and stacked on each other in the z-axis direction. Each layer defines extends along approximately the x-y plane. For example, each layer may define a major axis that is substantially planar (e.g., planar or nearly planar, but for minor surface variations) and extends substantially along the x-y plane.

Each of the individual carbon fiber layers may be formed by depositing a plurality of carbon fibers via a print head of a three-dimensional printing system around and between individual carbon fiber filaments of an array of carbon fiber filaments (not shown in FIG. 2) extending in the z-axis direction. For example, the array of carbon fiber filaments may include a plurality of individual carbon fiber filaments spaced apart from each other within the array, where each of the individual carbon fiber filaments extends in approximately the z-axis direction.

For ease of description, the plurality of carbon fibers are described as being mixed with a resin binder material when deposited by the print head of the three-dimensional printing system. However, other suitable techniques for depositing carbon fibers via a print head of a 3D printing system to form a layer of carbon fibers can also be used.

Any suitable carbon fiber may be used to form the individual carbon fiber layers of preform 50. Example fibers include, but are not limited to, polyacrylonitrile (PAN) fibers, pitch fibers, oxidized PAN, carbon fiber derived from PAN, carbon fiber derived from pitch, rayon, and the like. The carbon fibers may provide structural strength in the finished composite material. The carbon fibers may be a single filament or a carbon fiber tows. In some examples, a length of each of the fibers and fiber tows may vary, e.g., from about 0.1 inches (about 2.54 mm) to substantially continuous (e.g., continuous throughout a layer or multiple layers of carbon fibers for preform 50). In some examples, each carbon filament may be less than, e.g., approximately 20 microns in diameter. In some examples, the length of the fibers may be varied along the thickness, T, of preform 50. For example, the fibers used for a layer near the surface may has a length of approximately 0.25 inches (approximately 6.35 mm) while the fibers used for a layer near the middle of preform 50 may have a length of approximately 3 inches (approximately 7.62 cm) or less.

Any suitable resin binder material for forming preform 50 may be used. For example, the resin binder may be a carbonizable resin or pitch material such that carbon is formed from the resin during a carbonization process. Example resin matrix materials include, but are not limited to, synthetic, coal tar, petroleum isotropic and mesophase pitch, phenolic resin, epoxy resin or other carbon yielding resins. In some examples, the resin binder may include pitch. The pitch may be a hydrocarbon-rich material that may be extracted, e.g., from coal, tar, and petroleum. In some examples, the pitch may also be synthetically produced. In different examples, the pitch may come from a single source (e.g., coal) or may be a combination of different pitches from different sources. In some examples, the pitch may be a mesophase pitch. In other examples, the pitch may be an isotropic pitch. Combinations of mesophase and isotropic pitches are also contemplated.

Figure 3:
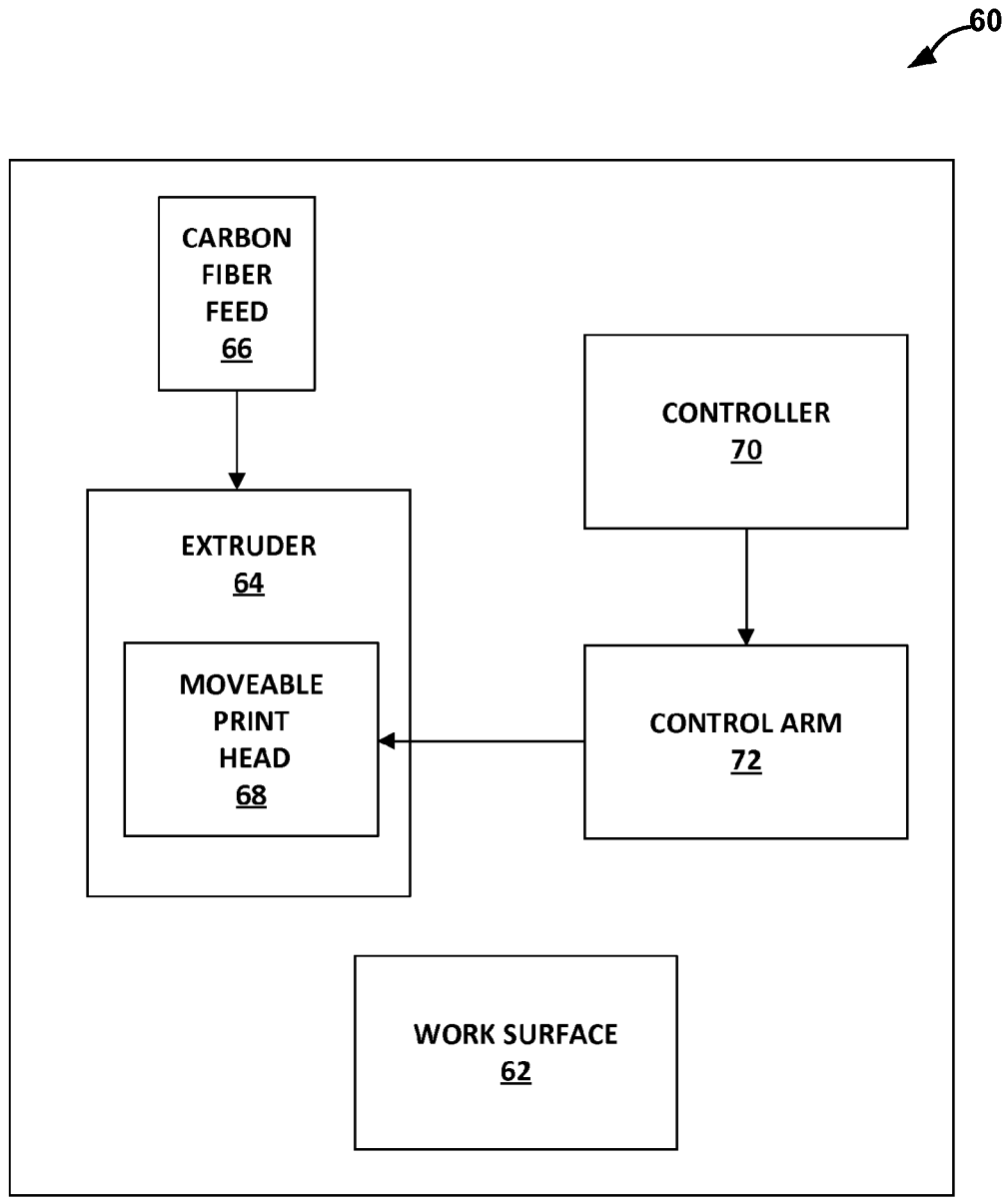
FIG. 3 is a schematic diagram illustrating an example three-dimensional printing system which may be used to manufacture the example preform of FIG. 2

FIG. 3 is a schematic diagram illustrating example three-dimensional printing system 60 which may be used, e.g., to form preform 50 via an additive manufacturing process. System 60 may be any suitable system configured to deposit layers of carbon fibers of composite material substrate 52 to form preform 50, e.g., using additive manufacturing techniques may be used. For ease of description, system 60 is described in terms of an extrusion deposition system. However, other systems for forming preform 50 by 3D printing are contemplated.

As shown, system 60 includes carbon fiber feed 66 which feeds carbon fibers mixed in a resin binder to moveable resin print head 68 by way of extruder 64. The resin binder may be used to bind the carbon fibers in each individual layer after being deposited by print head 68. Carbon fiber feed 66 may beat the mixture of carbon fiber and resin binder to a temperature that melts the mixture or otherwise softens the mixture in a manner that allows the carbon fiber and resin binder to flow out of one or more outlets defined by moveable print head 68. For example, print head 68 may include a die defining one or more apertures through which the carbon fiber and resin binder are forced out of during the 3D printing process (e.g., by applying a high pressure). The one or more apertures of the die of moveable print head 68 may have a geometry that allows for the deposited material to have a desired cross-section upon being forced out of moveable print head 68, e.g., via an extrusion process. Additionally or alternatively, system 60 may be configured to deposit a plurality of carbon fibers coated with resin binder via print head 68, e.g., by chopping or otherwise cutting a substantially continuous carbon fiber coated with the resin binder after exiting print head 68 to a layer of carbon fiber coat with resin binder.

Moveable print head 68 may be configured to be moveable in each of the x-axis, y-axis, and z-axis directions. The material flowing out of print head 68 may be directed towards work surface 62 to form a layer of carbon fibers. The material may be deposited via print head 68 on a continuous or discontinuous basis during the printing process, and the position of the print head 68 in the three-dimensional space relative to a carbon fiber layer on work surface 62 may be adjusted on a continuous or discontinuous basis.

In the example illustrated in FIG. 3, system 60 includes controller 70, which may control operation of system 60 during the process of depositing carbon fibers via print head 68 to form one or more layers of carbon fibers along the x-y plane around and between individual carbon fiber filaments of an array of carbon fibers extending in the z-axis direction, followed by translation of the array of carbon fiber filament relative to the x-y plane and/or rotation of the array of carbon fiber filaments about an axis substantially parallel to the z-axis direction. For example, during the carbon fiber deposition process, controller 70 may control the movement of control arm 72 to translate the position of moveable print head 68 in the x-y plane to form a substantially continuous layer of carbon fiber in the x-y plane. In some examples, controller 70 may then adjust the position of print head 68 in the z-axis direction such that print head 68 may then deposit carbon fibers on the previously formed layer to form another layer of carbon fibers in the x-y plane. Additionally or alternatively, work surface 62 can be moved in the z-axis direction relative to the print head 68.

In some examples, stepper motors, servo motors, or other suitable devices may be employed to move print head 68. Controller 70 may adjust the temperature, pressure, and flow rate of the carbon fibers out of print head to provide a layer of carbon fibers with desired properties. Additionally, controller 70 may control one or more other factors of the fabrication process, such as, e.g., the rotation and/or translation of the array of carbon fibers extending in the z-axis direction. As will be described below, in some examples, controller 70 may also be configured to control the translation and/or rotation of an array of carbon fiber filaments extending in the z-axis direction around which print head 68 deposits the individual layers of carbon fibers.

In some examples, controller 70 may include a microprocessor or multiple microprocessors capable of executing and/or outputting command signals in response to received and/or stored data. Controller 70 may include one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. Controller 70 may include computer-readable storage, such as read-only memories (ROM), random-access memories (RAM), and/or flash memories, or any other components for running an application and processing data for controlling operations associated with system 50. Thus, in some examples, controller 70 may include instructions and/or data stored as hardware, software, and/or firmware within the one or more memories, storage devices, and/or microprocessors. In some examples, controller 70 may control system 60 using a computer-aided manufacturing (CAM) software package running on a microcontroller. Controller 70 may include multiple controllers or only a single controller.

Figure 4:
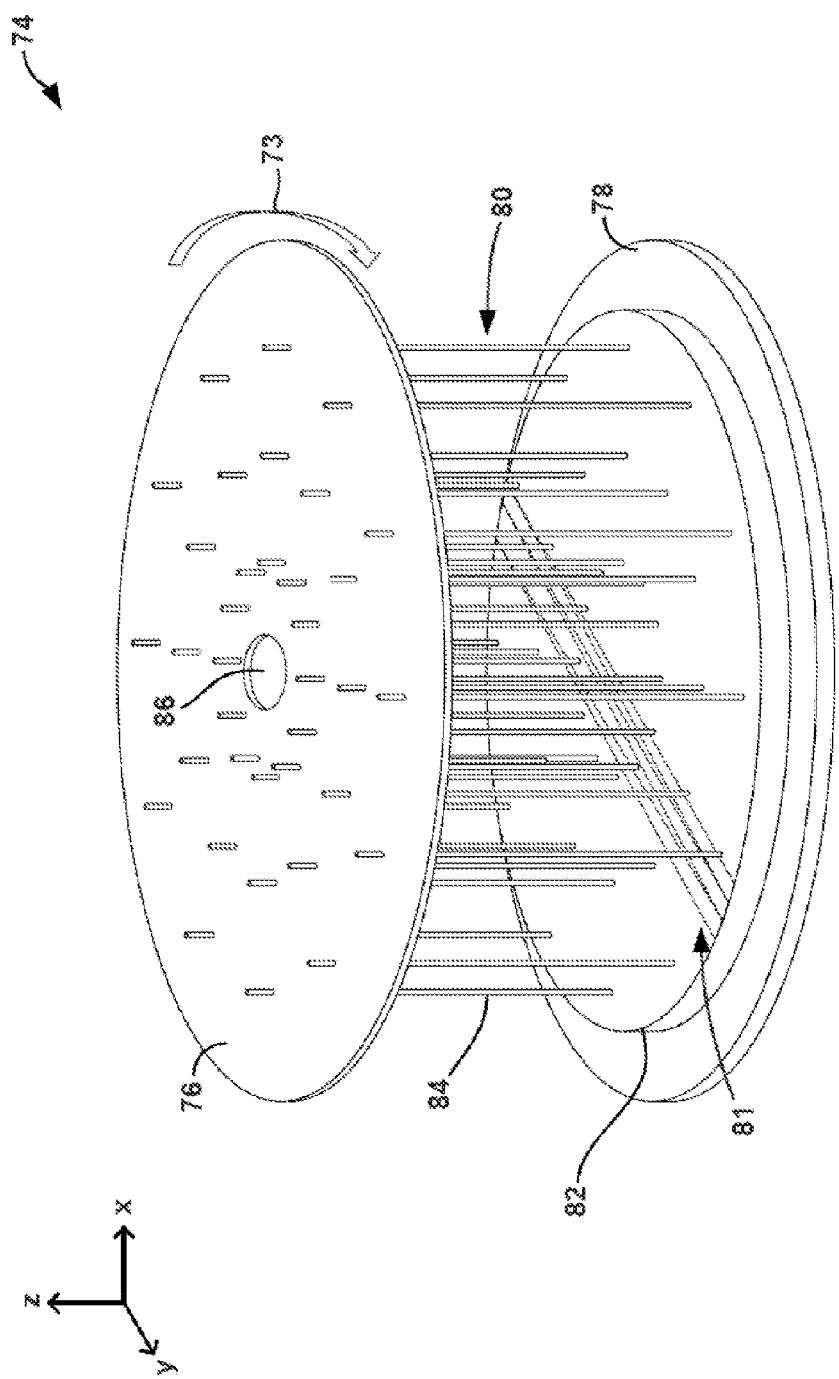
FIG. 4 is a conceptual diagram illustrating an example apparatus that may be employed by the three-dimensional printing system of FIG. 3.

FIG. 4 is a conceptual diagram of an example apparatus 74 that may be employed by three-dimensional printing system 60 to fabricate carbon fiber preform 50. As shown, apparatus 74 includes top plate 76 and bottom plate 78. Bottom plate 78 may generally correspond to work surface 62 in FIG. 3 in that print head 68 may deposit carbon fibers either directly or indirectly on the surface of bottom plate 78 to form a layer of carbon fibers in approximately the x-y plane. For example, print head 68 may move along path 81 relative to bottom plate 78 while depositing carbon fibers to form, in part, a layer of carbon fibers. As shown, one or more individual layers of carbon fibers 82 have been formed on the surface of bottom plate 78 by the deposition of a plurality of carbon fibers via print head 68 in the x-y plane.

A plurality of individual carbon fiber filaments (such as, e.g., carbon fiber filament 84) extend from top plate 76 to bottom plate 78 to form an array of carbon fiber filaments 80 extending in approximately the z-axis direction. Each of the carbon fiber filaments, e.g., filament 84, may be fixed or otherwise attached to both bottom plate 78 and top plate 76 such that array of carbon fiber filaments 80 move with top plate 76 as top plate 76 is rotated in direction 73, e.g., rotated about center 86 of top plate 76 in substantially the x-y plane, while bottom plate 78 is not rotated. In such a configuration, array of carbon fiber filaments 80 may be rotated about an axis substantially parallel to the z-axis direction following the formation of layer of carbon fibers 82 around and between individual carbon fiber filaments (e.g., filament 84) of array of carbon fibers 80. Additionally or alternatively, array of carbon fiber filaments 80 may be translated, e.g., relative to the x-y plane of the individual layers, such as in the z-axis direction. In some examples, top plate 76 and/or bottom plate 78 may be rotated and/or translated to rotate and/or translate array of carbon fiber filaments 80 following the formation of a carbon fiber layer on bottom plate 78. Controller 70 may control the movement, e.g., rotation, of top plate 76 and/or bottom plate 78.

Print head 68 may follow any suitable path 81 to deposit carbon fibers around and between individual carbon fiber filaments (e.g., filament 84) of array of carbon fibers 80. Path 68 may be selected such that a substantially continuous layer of carbon fibers are formed around and between individual carbon fiber filaments (e.g., filament 84) of array of carbon fibers 80 in a desired shape and thickness. In the example shown in FIG. 4, print head 68 may deposit carbon fibers along a rectilinear path 81 between various point along the outer perimeter of the desired layer (e.g., in a substantially zigzag fashion). Other linear and non-linear deposition paths 81 may be followed. In some example, the position of print head 68 relative array of carbon fiber filaments 80 in the x-y plane may be periodically moved (e.g., circumferentially) throughout the deposition process to allow for greater accessibility to print head 68 to the entire surface area around and between the individual carbon fiber filaments of array of carbon fiber filaments 80, e.g., to form a substantially continuous carbon fiber layer around and between array of carbon fiber filaments 80.

In some examples, filament 84 and the other filaments of array 80 may be connected to nozzles connected to top plate 76 above bottom plate 78 and any fiber layers extending substantially along the x-y plane, and then also connected to bottom plate 78 below the fiber layers using, e.g., a mechanical fastening system, such as, but not limited to, a threaded connection, an adhesive, or caps that extend through the thickness of plate 78 and prevent an end of filament 84 from being pulled through to the side of plate 78 on which the one or more layers 82 are formed. In some examples, controller 70, or another controller 70, may be configured to control the nozzles to control the position the filaments of array of carbon fiber filaments 80 in substantially the z-axis direction, e.g., by causing a mechanism to pull spooled and coated carbon fiber filaments in substantially the z-axis direction, to control the tension of the filaments throughout the carbon fiber layer builds around array of carbon fiber filaments 80.

In some examples, the carbon fiber filaments 80 may be a single filament or tow configuration coated in the resin used to provide a binding agent to the carbon fiber perform creating a workable structure, but that may be removed using a heat treat process during the later stages of manufacturing. The removal of the resin may be used to create the open pores in perform 50 that may be later filled (e.g., using CVD, CVI or pitch infiltration techniques) to create a densified carbon matrix material.

Figure 5:
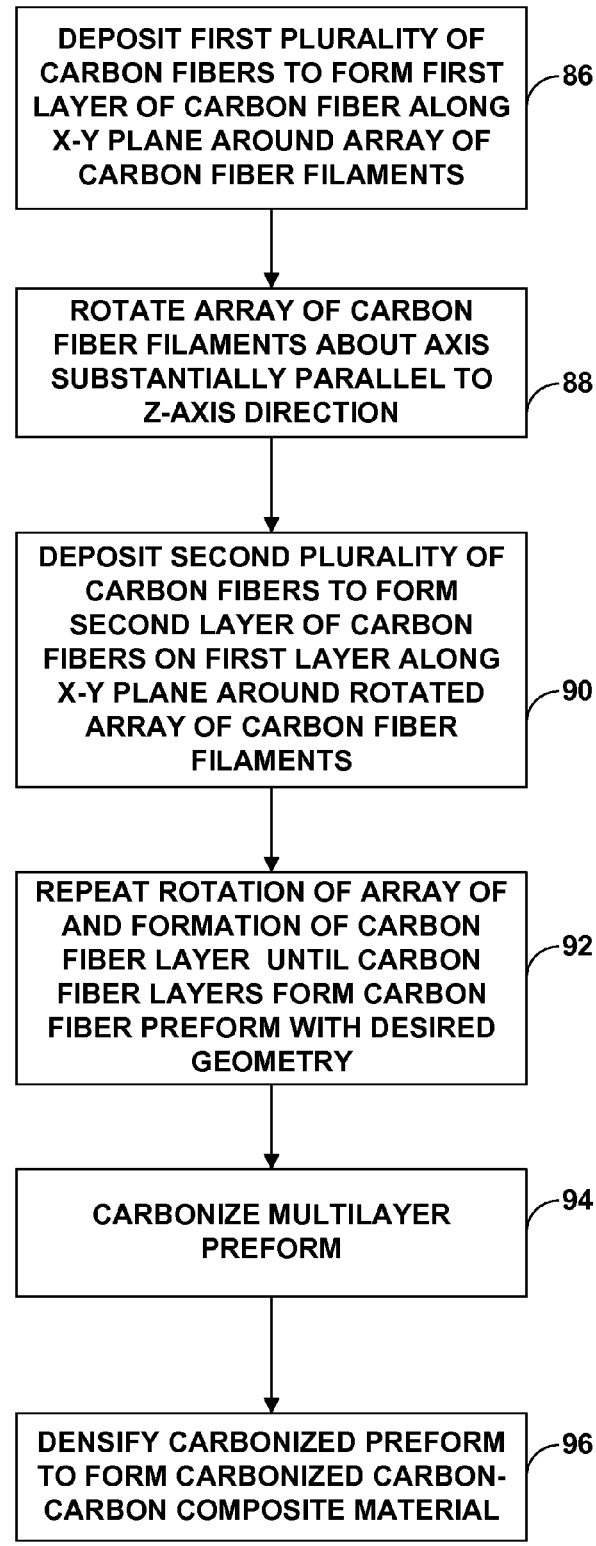
FIG. 5 is a flow diagram illustrating an example method the carbon fiber preform FIG. 2.

FIG. 5 is a flow diagram illustrating an example technique of forming preform 50 and, subsequently, a densified C—C composite material from preform 50 in accordance with aspects of the disclosure. For ease of illustration, the example of FIG. 5 is described as being performed via system 60 of FIG. 3 using apparatus 74 of FIG. 4. However, in other examples, other systems suitable for carrying out the additive manufacturing of carbon preform 50 may be used. Also, for ease of description, the technique of FIG. 5 is an example in which array of carbon filaments 80 are rotated about an axis substantially parallel to the z-axis between the formation of one or more of the layers of carbon fibers in the x-y plane, e.g., for z-axis direction attachment of the individual carbon fiber layers. However, array of carbon fiber filaments 80 may only be partially rotated in the sense that only one of top plate 76 or bottom plate 78 is rotated, or top and bottom plates 76, 78 are both rotated but the relative rotational position of the top and bottom plates changes, e.g., the lop plate is rotated in a first direction and the bottom plate is rotated in the opposite direction of the first direction. Alternatively or additionally, array of carbon filaments 80 may be translated relative to the x-y plane between the formation of one or more of the layer of carbon fibers in the x-y plane, e.g., for z-axis direction attachment of the individual carbon fiber layers. Again, the translation of array of carbon fiber filaments 80 may include only the movement (e.g., rectilinear movement) of top plate 76 but not bottom plate 78, or vice versa, in the x-y plane, or top and bottom plates 76, 78 are bath moved in x-y plane but the relative position of top plate 76 to bottom plate 78 changes, e.g., bottom plate 78 is moved in the positive x-axis direction and top plate 76 is moved in the negative x-axis direction.

As shown, controller 70 may control print head 68 to deposit a first plurality of carbon fibers from carbon fiber feed 66 onto bottom plate 78 to form a first layer of carbon fibers, e.g., carbon fiber layer 82, in substantially the x-y plane around and between the individual carbon fiber filaments of array of carbon fiber filaments 80 extending in approximately the z-axis direction (86). Subsequently, controller 70 may control the rotation of top plate 76 along direction 73 to rotate array of carbon fiber filaments 80 about an axis substantially parallel to the z-axis direction (88). For example, controller may rotate top plate 76 approximately one degree to approximately 10 degrees about the axis. In some examples, top plate 76 may be rotated to a design specific rotational degree. The design specific may be determined by how much z-fiber (e.g., in term of length of individual carbon fiber filaments 80) is desired to be bonded under an x-y plane carbon fiber layer and/or how much z-fiber locking is desired. In some examples, the more degrees of rotation, the more the x-y plane carbon fiber layer will be laid on top of the z-fiber, sealing and "weaving" it into place. In some examples, this may be accomplished by approximately one degree rotation to approximately 10 degrees rotation in either direction on a layer by layer basis, e.g., as determined by the specific product design.

Following the rotation array of carbon fiber filaments 80 (88), controller 70 may control print head 68 to deposit a second plurality of carbon fibers from carbon fiber feed 66 onto the previously formed layer, e.g. layer 82, to form a second layer of carbon fibers in substantially the x-y plane around and between the rotated array of carbon fiber filaments extending in approximately the z-axis direction (90). The process of rotating array of carbon filaments 80 along direction 73 and forming a layer of carbon fibers around and between the array of carbon fiber filaments 80 as rotated may be repeated until the individual layers of carbon fibers form, in combination, a desired carbon fiber preform 50, e.g., a carbon fiber preform with a desired geometry (92). After forming carbon fiber preform 50, array of carbon fiber filaments 80 may be cut above the top carbon fiber layer to allow perform 50 to be removed from apparatus 74 for further processing. As formed, the individual carbon fibers may substantially align with each other, e.g., on the outer diameter, and/or may be machined or otherwise processed, e.g., to define a smooth surface.

In some examples, the individual carbon fiber layers formed in the x-y plane along with the z-axis direction carbon filaments may be such that preform 50 includes any suitable amount of carbon fibers and resin binder. In some examples, preform 50 may include approximately 45 to approximately 85 weight percent (wt %) of carbon fibers, such as, e.g., approximately 50 to approximately 80 wt %, approximately 80 to approximately 85 wt %, or approximately 45 to approximately 50 wt %, Preform 50 may include approximately 15 to approximately 55 wt % of resin binder, such as, e.g., approximately 20 to approximately 50 wt %, approximately 15 to approximately 20 wt %, or approximately 50 to approximately 55 wt % of resin binder, where the balance of the composite may comprise, consist of, or consist essentially of carbon fibers.

In some examples, carbon fibers and the resin binder may be present in a ratio of approximately 50/50 carbon fibers to resin binder. In some examples, preform 50 may comprise, consist, or consist essentially of carbon fibers and resin binder. In some examples, increasing the amount of fibers may provide for a stronger C—C composite material from preform 50, while increasing the amount of resin binder may provide for a denser C—C composite material generated from preform 50. In some examples, preform 50 may include approximately 90 to approximately 99.9 wt % of carbon fibers and approximately 10 to 0.01 wt % of resin binder.

Subsequently, multilayer carbon fiber preform 50 may be carbonized by heating preform 50 to a temperature of, e.g., between approximately 550 degrees Celsius and approximately 2450 degrees Celsius (94). During the carbonization process, pyrolysis of the resin binder and/or fiber components occurs, and higher molecular weight components are broken down to various gases and carbon. Carbon remains in the carbonized component while the gases are eliminated.

Following carbonization of multilayer preform 50 (94), the carbonized preform may be densified with carbonaceous material using chemical vapor deposition (CVD)/chemical vapor infiltration (CVI) (96). For example, the carbonized preform may undergo one or more cycles of CVD/CVI to fill voids in the preform resulting from gas evolution during the carbonization processes. The carbonized preform may undergo one or more cycles of CVD/CVI until the material exhibits a desired density. For example, such a material may exhibit a density greater than or equal to approximately 1.7 grams per cubic centimeter (g/cc), such as between approximately 1.75 g/cc and approximately 1.90 g/cc.

In some examples of CVD/CVI, the carbonized preform is heated in a retort under the cover of inert gas, such as at a pressure below 100 torr. When the carbonized preform reaches a temperature between about 900 degrees Celsius and about 1200 degrees Celsius, the inert gas is replaced with a carbon-bearing gas such as natural gas, methane, ethane, propane, butane, propylene, or acetylene, or a combination of at least two of these gases. When the carbon-bearing gas flows around and through the carbonized preform, a complex set of dehydrogenation, condensation, and polymerization reactions occur, thereby depositing the carbon atoms within the interior and onto the surface of the carbonized preform. Over time, as more and more of the carbon atoms are deposited onto the surfaces of pores in the carbonized preform, the carbonized preform becomes denser. This process may be referred to as densification, because the open spaces in the carbonized preform are eventually filled with a carbon matrix until generally solid carbon parts are formed. U.S. Patent Application Publication No. 2006/0046059 (Arico et al.), the entire disclosure of which is incorporated herein by reference, provides an overview of example CVD/CVI processing that can be used with the techniques described herein. Other processing techniques can also be used in other examples to densify composite material substrate 52.

In some examples, individual carbon fiber layer of preform 50 formed in the x-y plane may be approximately 0.125 inches in thickness and may cover an area designed to specific products. For example, the shape of the individual carbon fiber layer may be deposited so that preform 50 includes an ID and an OD as well as other features, e.g., to form hardware attachment lugs. In some examples, the fiber volume density may be approximately 900 to approximately 1000 grams of fiber per square meter of part layer. The carbon fibers may be continuous or segmented depending on design specifics of the product. The final density and density gradients of the densified carbon-carbon composite material formed from preform 50 may be defined and may be product/part specific. As one example, the range of final density of a carbon-carbon composite material may range from about 1.5 to about 2.0 grams per cubic centimeter. In some examples, a carbon-carbon composite component formed from preform 50 that is to be used as an aircraft brake disc may include about 15 to about 30 total layers with an overall thickness of about 0.75 to 1.25 inches.

Examples of different techniques for forming carbon fiber preforms have been described. In different examples, techniques of the disclosure may be implemented in different hardware, software, firmware or any combination thereof. In some examples, techniques of the disclosure may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. In some examples, techniques of the disclosure may also be embodied or encoded in a computer-readable medium, such as a computer-readable storage medium, containing instructions. Instructions embedded or encoded in a computer-readable storage medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

Various examples have been described. These and other examples are within the scope of the following claims.

What is claimed is:

1. A method for forming a carbon fiber preform, the method comprising:
   forming an array of carbon fiber filaments by extending a plurality of carbon fiber filaments between a bottom plate and a top plate, wherein each carbon fiber filament of the array of carbon fiber filaments extend in approximately a z-axis direction relative to an x-y plane;
   depositing, via a print head of a three-dimensional printing system, a first plurality of carbon fibers on the bottom plate to form a first layer of carbon fibers in approximately the x-y plane, wherein the first plurality of carbon fibers are deposited around and between carbon fiber filaments of the array of carbon fiber filaments; and
   depositing, via a print head of a three-dimensional printing system, a second plurality of carbon fibers on the first layer of carbon fibers to form a second layer of carbon fibers in approximately the x-y plane, wherein the second plurality of carbon fibers are deposited around and between carbon fiber filaments of the array of carbon fiber filaments extending in approximately the z-axis direction relative to the x-y plane, wherein each carbon fiber filament of the array of carbon fiber filaments extends completely through both the first and second layers of carbon fibers.

2. The method of claim 1, further comprising:
   at least one of translating the array of carbon fiber filaments relative to the first layer of carbon fibers or rotating the array of carbon fiber filaments about an axis substantially parallel to the z-axis direction and relative to the first layer of carbon fibers following the formation of the first layer of carbon fibers, wherein the depositing the second layer of carbon fibers occurs following the at least one of translation or rotation of the array of carbon fiber filaments.

3. The method of claim 2, wherein rotating the array of carbon fiber filaments about the axis substantially parallel to the z-axis direction comprises rotating the top plate relative to the bottom plate between approximately one degrees and approximately ten degrees about the axis to cause the array of carbon fiber filaments to rotate relative to the first layer of carbon fibers.

4. The method of claim 2, wherein the carbon fiber preform includes between approximately 15 to approximately 30 total layers each formed by depositing a plurality of carbon fibers to form a respective layer of carbon fibers followed by the at least one of translating or rotating the array of carbon fiber filaments following the formation of the respective layer of carbon fibers, wherein the array of carbon fiber filaments extends through each of the approximately 15 to approximately 30 total layers.

5. The method of claim 1, wherein the first plurality of carbon fibers comprises a plurality of at least one of polyacrylonitrile (PAN) fibers, pitch fibers, oxidized PAN fibers, carbon fibers derived from PAN, carbon fibers derived from pitch, or rayon fibers.

6. The method of claim 1, wherein depositing, via the print head of the three-dimensional printing device, the first plurality of carbon fibers to form the first layer of carbon fibers comprises depositing, via the print head of the three-dimensional printing device, the first plurality of carbon fibers along with a resin binder to form a first layer of carbon fibers and resin binder.

7. The method of claim 6, wherein the resin binder comprises at least one of a synthetic resin, coal tar resin, petroleum isotropic and mesophase pitch, phenolic resin, or epoxy resin.

8. The method of claim 6, wherein preform includes between approximately 45 weight percent to approximately 85 weight percent of the plurality of carbon fibers, and between approximately 15 weight percent and approximately 55 weight percent of the resin binder.

9. The method of claim 1, further comprising:
carbonizing the carbon fiber preform; and
densifying the carbonized carbon fiber preform to form a densified carbon-carbon composite material.

10. The method of claim 9, wherein the densified carbon-carbon composite material exhibits a density greater than or equal to approximately 1.7 grams per cubic centimeter.

11. The method of claim 1, wherein the array of carbon fiber filaments comprises carbon fiber tows comprising the plurality of carbon fiber filaments, the carbon fiber tows extending from the bottom plate to the top plate.

12. A carbon fiber preform comprising:
a first layer of carbon fibers formed by depositing, via a print head of a three-dimensional printing system, a first plurality of carbon fibers and a first resin binder in approximately an x-y plane, the first resin binder configured to bind the first plurality of carbon fibers to form the first layer of carbon fibers;
a second layer of carbon fibers formed by depositing, via a print head of a three-dimensional printing system, a second plurality of carbon fibers and a second resin binder in approximately an x-y plane on the first layer, the second resin binder configured to bind the second plurality of carbon fibers to form the second layer of carbon fibers; and
an array of carbon fiber filaments extending in approximately a z-axis direction relative to the x-y plane, wherein the first plurality of carbon fibers and the second plurality of carbon fibers are both deposited around and between carbon fiber filaments of the array of carbon fiber filaments, wherein each carbon fiber filament of the array of carbon fiber filaments extends completely through both the first and second layers of carbon fibers.

13. The preform of claim 12, wherein the second plurality of carbon fibers and a second resin binder are deposited around and between the carbon fiber filaments of the array of carbon fiber filaments following at least one of translation of the array of carbon fiber filaments relative the first layer of carbon fibers or rotation of the array of carbon fiber filaments about an axis substantially parallel to the z-axis direction and relative to the first layer of carbon fibers.

14. The preform of claim 13, wherein the carbon fiber preform includes between approximately 15 to approximately 30 total layers each formed by depositing a plurality of carbon fibers to form a respective layer of carbon fibers followed by the at least one of translation or rotation of the array of carbon fiber filaments following the formation of the respective layer of carbon fibers, wherein each carbon fiber filament of the array of carbon fiber filaments extends through each of the approximately 15 to approximately 30 total layers.

15. The preform of claim 12, wherein the first plurality of carbon fibers comprises a plurality of at least one of polyacrylonitrile (PAN) fibers, pitch fibers, oxidized PAN fibers, carbon fibers derived from PAN, carbon fibers derived from pitch, or rayon fibers.

16. The preform of claim 12, wherein the first or second resin binder comprises at least one of a synthetic resin, coal tar resin, petroleum isotropic and mesophase pitch, phenolic resin, or epoxy resin.

17. The preform of claim 12, wherein the first and second layers of carbon fibers each include between approximately 45 weight percent to approximately 85 weight percent of the plurality of carbon fibers, and between approximately 15 weight percent and approximately 55 weight percent of the resin binder.

18. The preform of claim 12, wherein the array of carbon fiber filaments comprises carbon fiber tows comprising the plurality of carbon fiber filaments, the carbon fiber tows being substantially continuous through the first layer of carbon fibers and the second layer of carbon fibers.

* * * * *

UNITED STATES PATENT AND TRADEMARK OFFICE
CERTIFICATE OF CORRECTION

PATENT NO. : 9,944,526 B2
APPLICATION NO. : 14/711426
DATED : April 17, 2018
INVENTOR(S) : Troester et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 107 days.

Signed and Sealed this
Eighteenth Day of December, 2018

Andrei Iancu
*Director of the United States Patent and Trademark Office*